United States Patent

Pacheco et al.

(10) Patent No.: US 9,963,234 B2
(45) Date of Patent: May 8, 2018

(54) ENERGY ABSORBING ASSEMBLY FOR AIRCRAFT SEAT

(71) Applicant: AMI Industries, Inc., Colorado Springs, CO (US)

(72) Inventors: Chad R. Pacheco, Colorado Springs, CO (US); Kyler J. Marutzky, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 10 days.

(21) Appl. No.: 15/210,393

(22) Filed: Jul. 14, 2016

(65) Prior Publication Data

US 2018/0016015 A1    Jan. 18, 2018

(51) Int. Cl.
*B64D 11/06*    (2006.01)

(52) U.S. Cl.
CPC ...... *B64D 11/0619* (2014.12); *B64D 11/0691* (2014.12); *B64D 11/0696* (2013.01)

(58) Field of Classification Search
CPC ............ B64D 11/0619; B64D 11/0691; B64D 11/0696; B60N 2/42736
See application file for complete search history.

(56) References Cited

U.S. PATENT DOCUMENTS

| | | | |
|---|---|---|---|
| 2,301,903 A * | 11/1942 | Flader ................. | B64D 25/04 248/580 |
| 3,532,379 A | 10/1970 | Reilly, et al. | |
| 4,128,217 A | 12/1978 | Mazelsky | |
| 4,487,383 A | 12/1984 | Mazelsky | |
| 4,523,730 A | 6/1985 | Martin | |
| 4,718,719 A * | 1/1988 | Brennan ................ | B64D 11/06 244/122 R |
| 4,997,233 A | 3/1991 | Sharon | |
| 5,074,391 A | 12/1991 | Rosenzweig | |
| 5,507,555 A | 4/1996 | Kiguchi | |
| 8,616,637 B2 * | 12/2013 | Trimble ............. | B64D 11/0696 297/216.15 |
| 2010/0129137 A1 | 5/2010 | Heidari | |

(Continued)

FOREIGN PATENT DOCUMENTS

| | | |
|---|---|---|
| EP | 2602434 A2 | 6/2013 |
| WO | WO9107315 A1 | 5/1991 |
| WO | 2011111226 | 9/2011 |

OTHER PUBLICATIONS

Extended European Search Report dated Jan. 18, 2018 in European Application No. 17180925.4.

*Primary Examiner* — Philip F Gabler

(74) *Attorney, Agent, or Firm* — Snell & Wilmer L.L.P.

(57) ABSTRACT

An energy absorbing assembly includes an attachment component configured to be coupled to a mounting structure. The energy absorbing assembly also includes an anchor that has a tip portion, a shaft, and a head. The anchor is configured to extend through the attachment component such that the head is disposed on a first side of the attachment component and the tip portion is disposed on a second side of the attachment component and is configured to be coupled to the mounting structure. The energy absorbing assembly also includes a deformable member configured to be positioned concentrically around the shaft of the anchor. The deformable member is configured to be retained between the first side of the attachment component and the head of the anchor.

11 Claims, 6 Drawing Sheets

(56) References Cited

U.S. PATENT DOCUMENTS

| | | | |
|---|---|---|---|
| 2013/0168529 A1* | 7/2013 | Baumann | B60N 2/01575 |
| | | | 248/548 |
| 2013/0287520 A1 | 10/2013 | Hartzler | |
| 2014/0368012 A1 | 12/2014 | Burd | |
| 2015/0231996 A1* | 8/2015 | Ham | B60N 2/42736 |
| | | | 297/344.1 |
| 2015/0251762 A1 | 9/2015 | Ehlers et al. | |

* cited by examiner

ENERGY ABSORBING ASSEMBLY FOR AIRCRAFT SEAT

FIELD

The present disclosure relates to systems and methods for energy absorption, and more specifically, to absorbing loads on aircraft seats.

BACKGROUND

Various fixtures in an aircraft cabin, such as seats for pilots, attendants, and passengers, are generally mounted to the airframe. For example, attendant seats may be installed on tracks that allow the attendant seats to be moved or otherwise repositioned. However, load forces applied to the attendant seat, due to repositioning the seats, in-flight turbulence, take-off, landing, or other occurrences, are often transferred to the mounting structure (e.g., tracks). Such a transferred load may damage or deform the mounting structure and/or the airframe.

SUMMARY

In various embodiments, the present disclosure provides an energy absorbing assembly. The energy absorbing assembly includes an attachment component configured to be coupled to a mounting structure. The energy absorbing assembly also includes an anchor that has a tip portion, a shaft, and a head. The anchor is configured to extend through the attachment component such that the head is disposed on a first side of the attachment component and the tip portion is disposed on a second side of the attachment component and is configured to be coupled to the mounting structure. The energy absorbing assembly also includes a deformable member configured to be positioned concentrically around the shaft of the anchor. The deformable member is configured to be retained between the first side of the attachment component and the head of the anchor.

In various embodiments, the deformable member undergoes plastic deformation in response to a first load placed on the attachment component. In various embodiments, the first load is less than a yield point of the mounting structure. In various embodiments, the first load is less than both a yield point of the mounting structure and less than a yield point of at least a portion of the attachment component adjacent the anchor. The first load may be between about 4,000 pound-force and about 8,500 pound-force. In various embodiments, the deformable member is configured to absorb between about 90 Joules and about 350 Joules of energy.

According to various embodiments, the deformable member may be made from at least one of steel, aluminum, aluminum alloy, titanium, or titanium alloy. In various embodiments, the deformable member may be made from a martensitic precipitation-hardening stainless steel. In various embodiments, the attachment component is a flight attendant seat of an aircraft. The mounting structure may be a track affixed to an airframe of an aircraft. In various embodiments, the anchor is non-directly fastened to the attachment component.

Also disclosed herein, according to various embodiments, is an energy absorbing arrangement for a seat. The energy absorbing arrangement may include a seat foot attached to the seat and a deformable member. The deformable member, according to various embodiments, may be in operable communication with the seat foot and a mounting structure of a vehicle supporting the seat. In various embodiments, the deformable member is configured to deform in response to a load between the seat foot and the mounting structure exceeding a threshold value, wherein deformation of the deformable member is contained so that the seat continues to be supported by the mounting structure after the deformable member has been deformed.

In various embodiments, the energy absorbing arrangement may further include an anchor having a tip portion, a shaft, and a head. The anchor may extend through the seat foot such that the head is disposed on a first side and the tip portion is disposed on a second side, wherein the tip portion of the anchor is coupled to the mounting structure. In various embodiments, the seat foot includes a rear portion and a front portion. The rear portion may have the anchor and the deformable member. In various embodiments, the anchor is a first anchor and the deformable member is a first deformable member, wherein the rear portion has a second anchor and a second deformable member. According to various embodiments, the first side of the seat foot may face upward towards the seat and the second side of the seat foot may face downward towards a floor of the aircraft. In various embodiments, the anchor may be non-directly fastened to the seat foot.

In various embodiments, the energy absorbing arrangement may further include the mounting structure, wherein the mounting structure comprises a seat trunnion affixed to the airframe of the aircraft. In various embodiments, the mounting structure may be a track affixed to the airframe of the aircraft.

Also disclosed herein, in accordance with various embodiments, is a method of manufacturing an energy absorbing assembly. The method may include positioning a deformable member concentrically around a shaft of an anchor and extending the anchor completely through an attachment component such that a head of the anchor is disposed on a first side of the attachment component and a tip portion of the anchor is disposed on a second side of the attachment component. In such a configuration, the deformable member is retained between the first side of the attachment component and the head of the anchor. The method may further include, after extending the anchor completely through the attachment component, coupling the tip portion of the anchor to a mounting structure. In various embodiments, extending the anchor completely through the attachment component includes non-directly fastening the anchor to the mounting attachment component.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
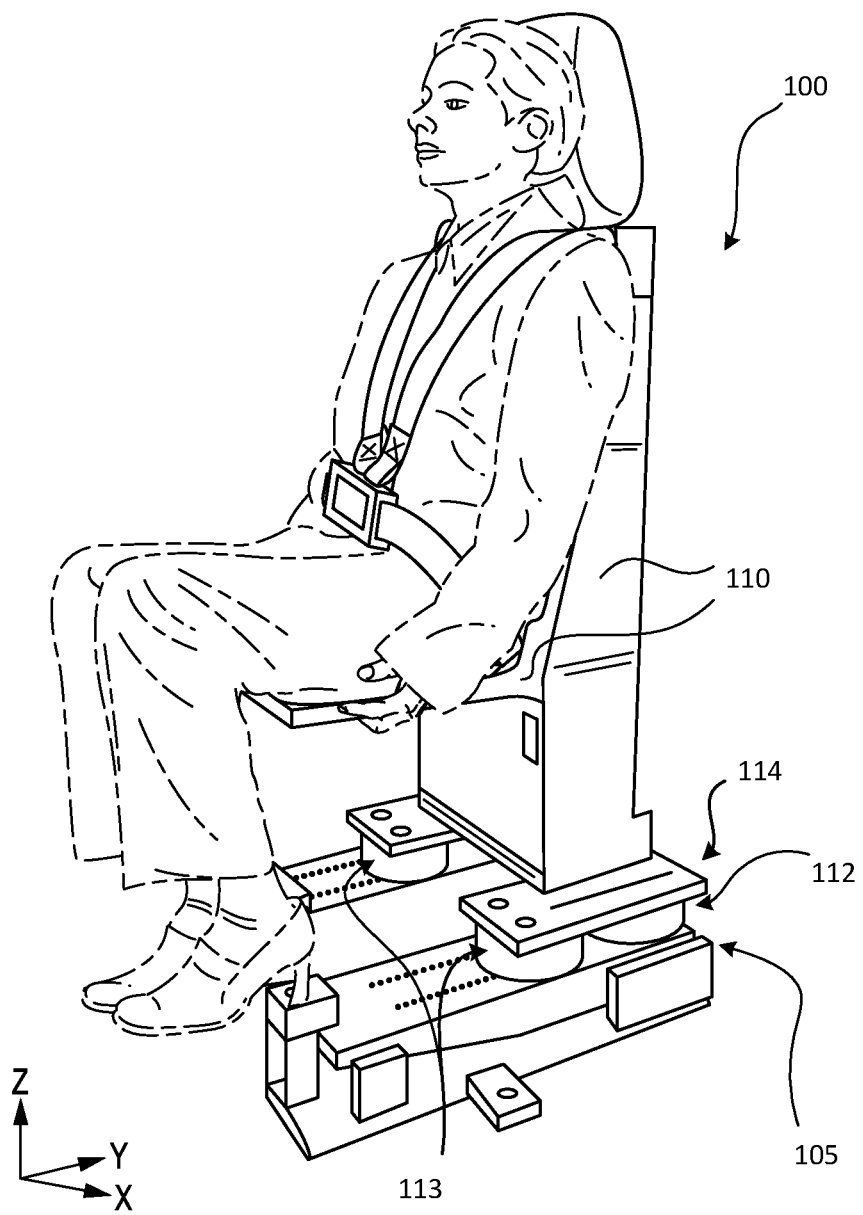
FIG. 1 illustrates a perspective view of a seat assembly, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, an energy absorbing assembly is disclosed for preventing structural damage to certain components. Generally, the energy absorbing assembly may include a deformable member positioned between two components that is configured to undergo at least a degree of deformation, whether reversible (e.g., elastic deformation) or irreversible (e.g., plastic deformation), in response to an applied load. In various embodiments, the deformable member may be a crushable tube. The deformation of the deformable member, according to various embodiments, absorbs the applied load and thereby prevents structural damage to the other two components, among others, in the assembly while also improving the likelihood that the assembly will remain intact.

Figure 3:
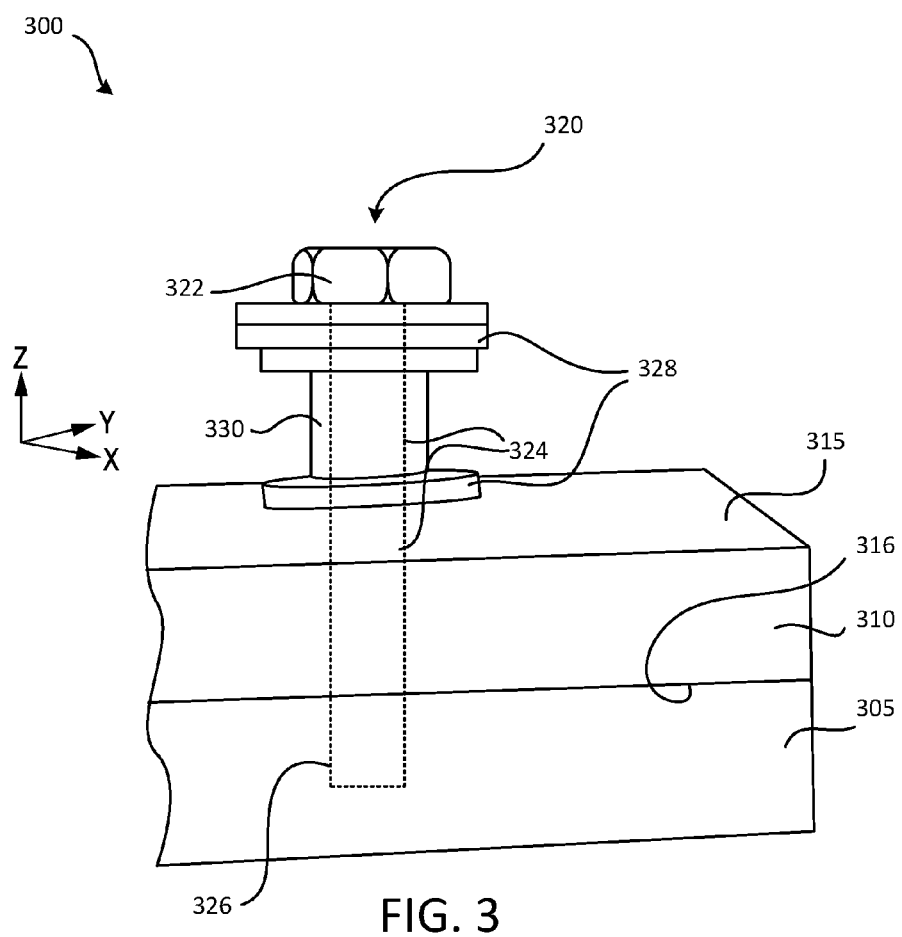
FIG. 3 illustrates a side perspective view of an energy absorbing assembly, in accordance with various embodiments.

With reference to FIG. 3, and in accordance with various embodiments, the energy absorbing assembly 300 generally includes an attachment component 310, an anchor 320, and a deformable member 330. The attachment component 310 is configured to be coupled to a mounting structure 305 via the anchor 320. As shown in FIG. 3, and according to various embodiments, the anchor 320 includes a head 322, a shaft 324, and a tip portion 326. The shaft 324 and the tip portion 326 of the anchor 320 are shown in dashed-lines because such portions of the anchor 320 extend at least partially through the attachment component 310 and the mounting structure 305 and thus would not otherwise be visible in the perspective view of FIG. 3.

The anchor 320 extends through the attachment component 310 and is fastened/secured to the mounting structure 305. That is, in the installed state, the head 322 of the anchor 320 protrudes from a first side 315 of the attachment component 310, the shaft 324 of the anchor 320 extends through and is disposed within a pass-through bore in the attachment component 310, and the tip portion 326 of the anchor 320 protrudes from a second side 316 of the attachment component 310 and is fastened/secured to the mounting structure 305.

In various embodiments, the deformable member 330 is positioned concentrically around at least a portion of the shaft 324 of the anchor 320 and is retained between the first side 315 of the attachment component 310 and the head 322 of the anchor 320. As described above, the deformable member 330, according to various embodiments, may undergo elastic and/or plastic deformation in response to a load differential between the attachment component 310 and the mounting structure 305. Stated another way, for example, if the attachment component 310 experiences a tensile load or a shear load, among others, the deformable member 330 may at least partially deform under the resultant compression force, thereby absorbing/attenuating the load in order to prevent structural damage to the attachment component 310 and the mounting structure 305, among other components. The deformation of the deformable member 330 may also allow the attachment component 310 to remain coupled to the mounting structure 305 (via the anchor 322).

In various embodiments, the energy absorbing assembly 300 may further include auxiliary fastening elements 328, such as nuts, washers, and the like to facilitate the coupling and secure engagement between the anchor 320, the deformable member 330, and the first side 315 of the attachment component 310. Additional details pertaining to the energy absorbing assembly 300 are included below.

Figure 2:
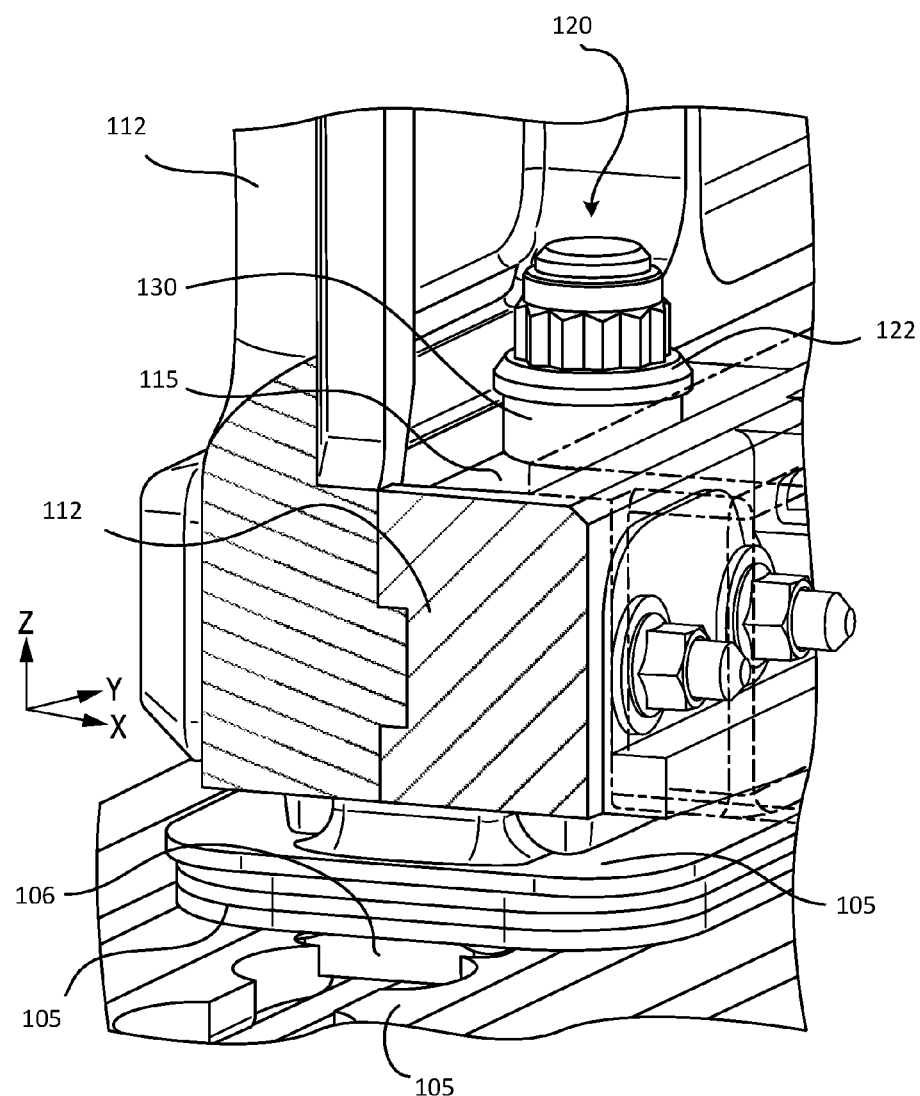
FIG. 2 illustrates a perspective cross-sectional view of an energy absorbing assembly, in accordance with various embodiments.

With reference to FIGS. 1 and 2, and in accordance with various embodiments, the energy absorbing assembly 300 may be implemented in a seat assembly 100 of an aircraft. In various embodiments, the seat assembly 100 includes a seat 110, an anchor 120, and a deformable member 130. Throughout the present disclosure, similar reference numbers refer to similar components. Accordingly, the seat 110 is similar to the attachment component 310, the anchor 120 is similar to the anchor 320, and the deformable member 130 is similar to the deformable member 330. In various embodiments, a mounting structure 105 is affixed to an airframe of the aircraft. The mounting structure is similar to mounting structure 305. In various embodiments, the mounting structure 105 may be a bracket, trunnion 106, track, flange, or other connection element, among others, to which the seat 110 is mounted.

The seat 110 may be a passenger seat, an attendant seat, or a pilot seat, among other types of seats. The seat foot 112 is a base portion of the seat 110 that is configured to be coupled to the mounting structure 105 via the anchor 120. As described in further detail below and according to various embodiments, the seat foot 112 of the seat 110 may not be directly fastened to the mounting structure 105 but instead may be held adjacent to the mounting structure by the anchor 120. Stated another way, while the seat foot 112 may be in direct contact with the mounting structure 105, such contact may be non-fastening or at least may not include a primary fastening means between the seat foot 112 and the mounting structure 105. Accordingly, the anchor 120 may extend through the seat foot 112 and may be coupled to the mounting structure 105. In such a configuration, a head 122 of the anchor 120 protrudes from a first side 115 of a portion of the seat foot 112 (e.g., the top side) and a tip portion of the anchor 120 protrudes from a second side of a portion of the seat foot 112 (e.g., the bottom side).

XYZ axes are shown in several figures for convenience, with z extending perpendicular to the xy plane. In that regard, a measurement point displaced in the positive z axis direction from a given reference point may be considered "above" or on "top" of the given reference point. In contrast, a measurement point displaced in the negative z axis direction from the given reference point may be considered "below" or on "bottom" of the given reference point. In that regard, the terms "top" and "bottom" may refer to relative positions along the z axis. For example, seat assembly 100 may be positioned above or "on top of" the seat foot 112.

As mentioned above and in various embodiments, the deformable member 130 may be disposed concentrically around at least a portion of the anchor 120 and retained between the first side 115 of the seat foot 112 and the head 122 of the anchor 120. In various embodiments, the deformable member 130 may be oriented in a vertical direction. In various embodiments, the deformable member may be oriented in other directions. In various embodiments, the head 122 of the anchor 120 may be a nut or other separable component that may, for example, be threadably engaged with the anchor 120. In such an example, the anchor 120 may be a threaded stud and the head 122 may be a nut that is rotated relative to the anchor 120 to secure and retain the crush but 130 between the head 122 of the anchor 120 and the first side 115 of the seat foot 112. In various embodiments, the anchor 120 may be a bolt or other similar component and the head 122 may be integrated and unitary with the shaft 124 and tip portion 126 of the anchor 120. In various embodiments, the tip portion 126 of the anchor 120 may include connection features, such as threads or the like, that enable the anchor 120 to securely connect with the mounting structure 105.

As briefly described above, the deformable member 130, according to various embodiments, may be configured to absorb, via deformation, an applied load and thereby prevent structural damage to the seat 110, seat foot 112, and mounting structure 105, among others. Such absorption by the deformable member 130 may also improve the likelihood that the seat assembly 100 will remain intact in response to the seat assembly 100 experiencing the load. Further details relating to the deformable member 130 and energy absorption are included below with reference to FIG. 4A-5.

The seat foot 112, according to various embodiments, may have one or more front portions 113 and one or more rear portions 114, relative to the facing direction of the seat 110. In various embodiments, the seat assembly 100 may include a single deformable member 130. In various embodiments, however, the seat assembly 100 may include multiple deformable members 130. For example, in various embodiments one or more of the rear portions 114 of the seat foot 112 may have a respective deformable member 130 while the front portions 113 of the seat foot 112 may not. In various embodiments, the seat assembly 100 may include multiple deformable members 130 and multiple corresponding anchors 120 extending through the one or more rear portions 114 of the seat foot 112. In various embodiments, both front 113 and rear portions 114 of the seat foot 112 may have one or more anchors 120 and respective deformable members 130 extending there-through.

The configuration, number, position, and orientation of the deformable members 130 may be dependent on various factors, including the magnitude of the expected load and/or the direction of the expected load. For example, the mounting structure 105 may be a track that allows the position of the seat across the floor of the aircraft to be adjusted. Without the deformable member 130, the forces involved with moving the seat 110 along the track mounting structure 105 may deform, bend, crack, or otherwise damage portions of the seat 110, seat foot 110, and/or mounting structure 105. The deformable member 130, however, absorbs such forces/loads to prevent the seat 110, seat foot 110, and/or mounting structure 105 from reaching the respective mechanical yield points.

In various embodiments, the deformable member 130 may be made of metal, an alloy, aluminum, an aluminum alloy, titanium, a titanium alloy, steel, and a stainless steel, among others. In various embodiments, the deformable member 130 is made from a martensitic precipitation-hardening stainless steel such as that sold commercially as both 17-4® stainless steel and/or 15-5® stainless steel. In various embodiments, the deformable member 130 may be surface treated or heat treated. In various embodiments, the deformable member 130 may be heat treated to H1025 and passivated per AMS-2700, Type 2, Class III protocol as set forth by SAE International.

In various embodiments, the material of the deformable member 130 may be selected based on how the yield strength of the deformable member 130 compares to the yield strength of the seat 110, seat foot 112, anchor 120, and mounting structure 105. For example, the deformable member 130 may be configured to have a mechanical yield strength that is less than the lowest mechanical yield strength of the seat 110, seat foot 112, anchor 120, and mounting structure 105, thereby allowing the deformable member 130 to absorb the load and thus preventing structural damage/deformation of the seat 110, seat foot 112, anchor 120, and mounting structure 105. Accordingly, in various embodiments the anchor 120 may be non-directly fastened to the seat foot 112 and/or the seat foot 112 may be non-directly fastened to the mounting structure 105 in order to allow and load differential between the seat 110 and the mounting structure 105 to be absorbed/attenuated in the deformable member 130. That is, the term non-directly fastened may mean that while the anchor 120 may be in direct contact with the seat foot 112 and/or the seat foot 112 may be in direct contact with the mounting structure 105, such components are not directly, rigidly, or mechanically affixed together.

Figures 4A, 4B:
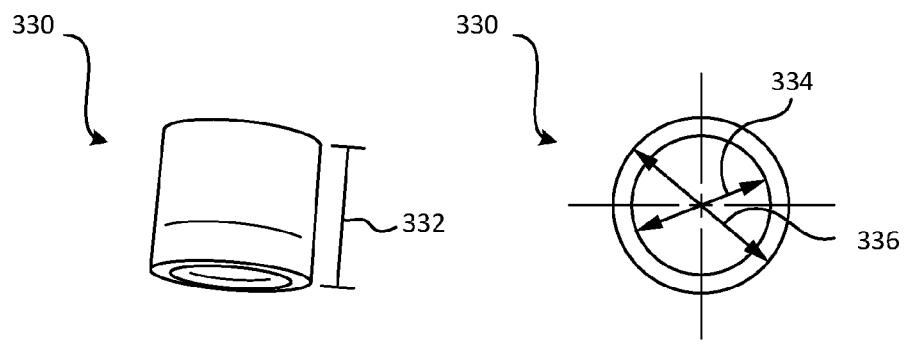
FIG. 4A illustrates a perspective view of a deformable member, in accordance with various embodiments.
FIG. 4B illustrates a top view of a deformable member, in accordance with various embodiments.
Figure 4C:
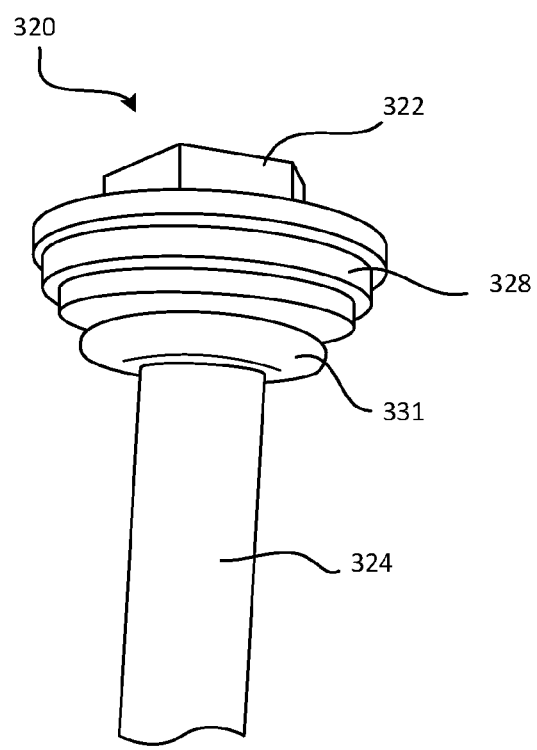
FIG. 4C illustrates a perspective view of an anchor and a deformable member, in accordance with various embodiments.

With reference to FIGS. 4A-4C, and in accordance with various embodiments, various dimensions of the deformable member 330 are shown. FIG. 4A shows a perspective view of the deformable member 330 removed from the energy absorbing assembly 300 and FIG. 4B, shows a top view of the deformable member 330. The deformable member 330 has a height 332, an inner diameter 334, and an outer diameter 336. In various embodiments, the dimensions 332, 334, 336 of the deformable member 330 may be dependent on the magnitude of the expected or anticipated load, the material of the deformable member 330, and/or the material of the other components (attachment component 310, mounting structure 305, anchor 320, etc.). For example, a comparatively thicker deformable member will have a comparatively higher maximum load rating than a comparatively thinner deformable member.

FIG. 4C shows a perspective view of a crushed tube 331. In various embodiments, the deformable member 330 may have a maximum deflection value that represents the maximum height change that the deformable member 330 undergoes during plastic deformation as it transitions from deformable member 330 to crushed tube 331. In various embodiments, the material and dimensions of the deformable member 330 may be selected based on the time it takes for the deformable member 330 to be undergo complete plastic deformation and attain the maximum deflection value. For example, upon application of a specific load, the deformable member 330 may experience irreversible plastic deformation for a period of time before ultimately reaching the crushed tube 331 (e.g., before attaining the maximum deflection value). Such a time period may be sufficiently long that, once time has passed, the load/force has dissipated. For example, in the event of turbulence, seat movement, landing, or emergency landings, among others, the resultant force/load on the seats 110 may only last for a certain period of time. If such a period of time is less than the deformation time it takes for the deformable member 330 to reach the crushed tube 331, the deformable member may be able to absorb the majority of the force/load during the duration of the force/load. The deformable member 330 may also facilitate a relatively even distribution of a load, thus reducing the concentration of load in one or more localized areas.

Figure 5:
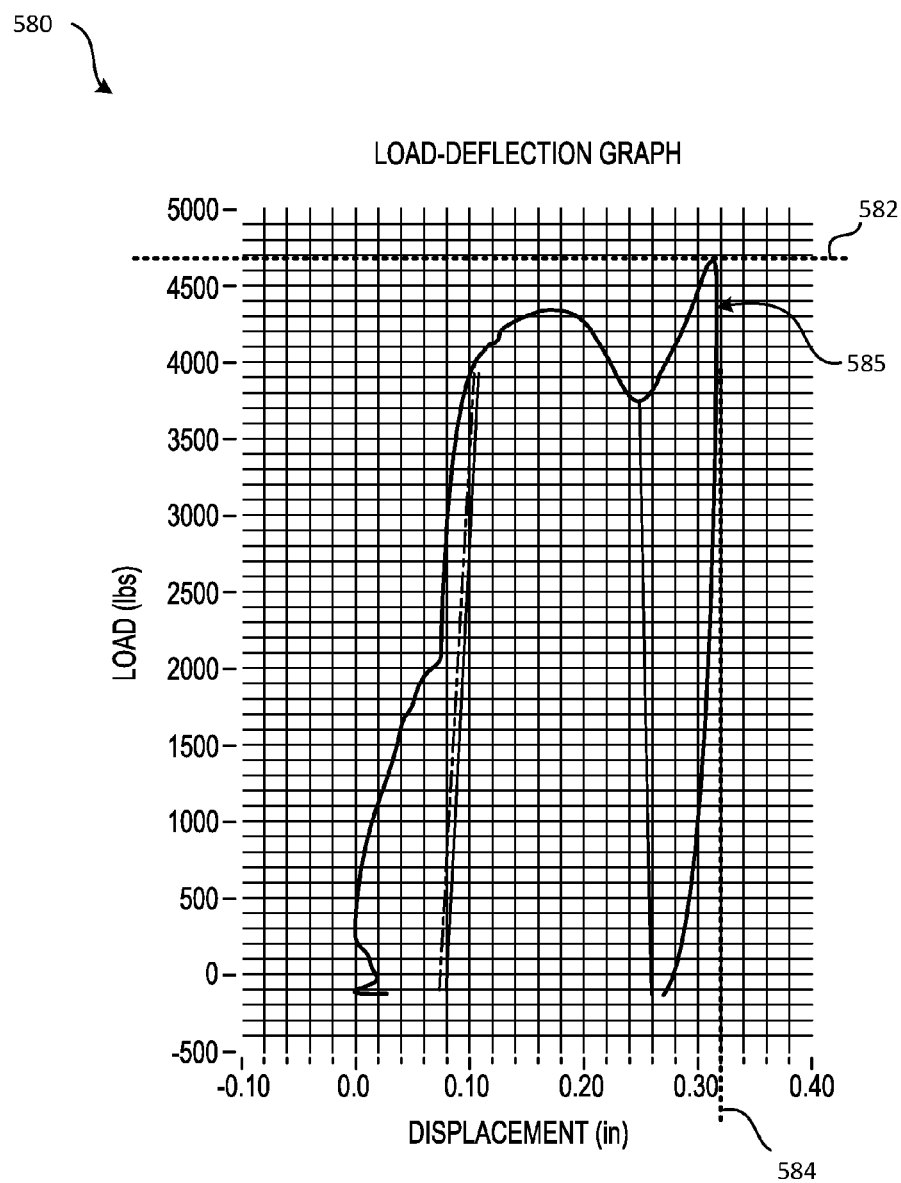
FIG. 5 illustrates a load-deflection graph of a deformable member, in accordance with various embodiments.

FIG. 5 shows a load-deflection graph 580 of the deformable member 330, according to various embodiments. The load-deflection graph 580 shows a maximum load absorption 582 and a maximum deflection value 584. The area under load-deflection curve 585 represents the work absorbed by the deformable member 330. In various embodiments, the deformable member 330 is configured to plastically deform in response to a load of between about 4,000 pound-force (17,800 newtons) and about 8,500 pound-force (37,800 newtons). In various embodiments, the deformable member 330 is configured to plastically deform in response to a load of about 6,000 pound-force (26,700 newtons). In various embodiments, the deformable member 330 is configured to absorb between about 90 Joules and about 350 Joules of energy. In various embodiments, the deformable member 330 is configured to absorb between about 100 Joules and about 250 Joules of energy. In various embodiments, the deformable member is configured to absorb about 150 Joules of energy.

Figure 6:
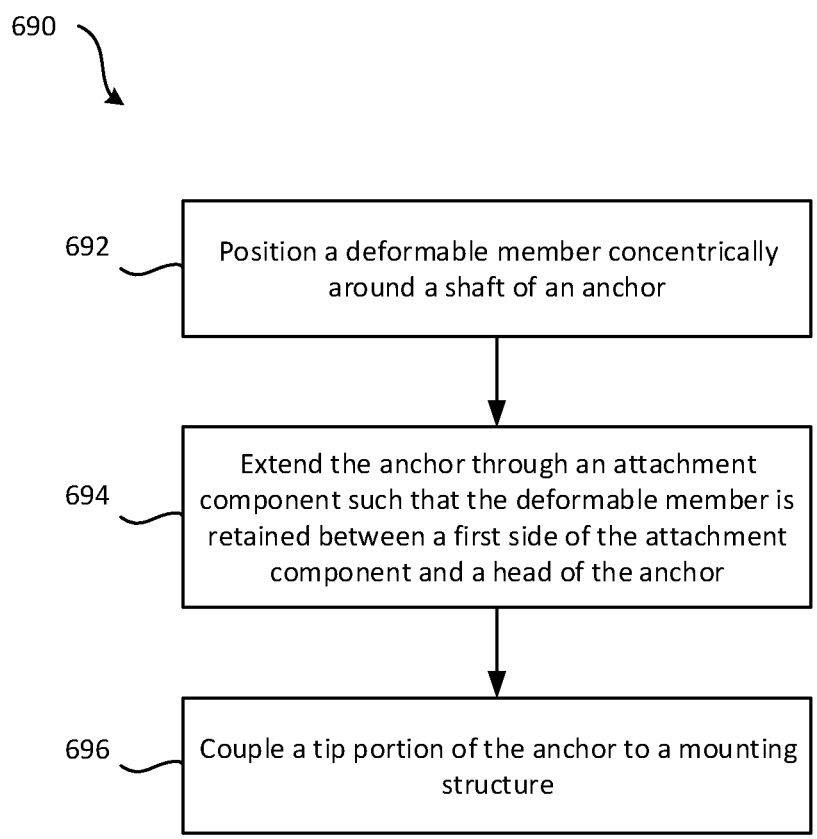
FIG. 6 illustrates a method of manufacturing an energy absorbing assembly foot, in accordance with various embodiments.

FIG. 6 shows a method 690 for manufacturing the energy absorbing assembly 300, in accordance with various embodiments. The method 690 may include positioning the deformable member 330 concentrically around the shaft 324 of the anchor 320 (step 692). The method 690 further may include extending the anchor 320 completely through the attachment component 310 such that the head 322 of the anchor 320 is disposed on the first side 315 of the attachment component 310 and the tip portion 326 of the anchor 320 is disposed on the second side 316 of the attachment component 310 (step 694). In such a step, the deformable member 330 may be retained between the first side 315 of the attachment component 310 and the head 322 of the anchor 320. Still further, the method 690 may include, after extending the anchor 320 completely through the attachment component 310, coupling the tip portion 326 of the anchor to the mounting structure 305 (step 696). In various embodiments, step 694 may include non-directly fastening the anchor to the seat foot.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An energy absorbing arrangement for a seat, comprising:
   a seat foot attached to the seat;
   a mounting structure;
   an anchor comprising a tip portion, a shaft, and a head, wherein the anchor extends through the seat foot such that the head is disposed on a first side of the seat foot and the tip portion is disposed on a second side of the seat foot, wherein the tip portion of the anchor is coupled to the mounting structure and the anchor is non-directly fastened to the seat foot; and
   a deformable member positioned concentrically around the shaft of the anchor and retained between the first side of the seat foot and the head of the anchor, wherein the deformable member is a metallic material;
   wherein the deformable member is configured to undergo plastic deformation in response to a load between the seat foot and the mounting structure exceeding a threshold value, wherein deformation of the deformable member is contained so that the seat continues to be supported by the mounting structure after the deformable member has been deformed.

2. The energy absorbing arrangement of claim 1, wherein the seat foot comprises a rear portion and a front portion, wherein the rear portion has the anchor and the deformable member, wherein the anchor is a first anchor and the deformable member is a first deformable member, wherein the rear portion has a second anchor and a second deformable member.

3. The energy absorbing arrangement of claim 1, wherein the first side of the seat foot faces upward towards the seat and the second side of the seat foot faces downward towards a floor of the aircraft.

4. The energy absorbing arrangement of claim 1, wherein the anchor is non-directly fastened to the seat foot.

5. The energy absorbing arrangement of claim 1, further comprising the mounting structure, wherein the mounting structure comprises a seat trunnion affixed to the airframe of the aircraft.

6. The energy absorbing arrangement of claim 1, further comprising the mounting structure, wherein the mounting structure comprises a track affixed to the airframe of the aircraft.

7. The energy absorbing arrangement of claim 1, wherein the threshold value is less than a yield point of the mounting structure.

8. The energy absorbing arrangement of claim 1, wherein the threshold value is less than a yield point of the mounting structure and less than a yield point of at least a portion of the seat foot adjacent the anchor.

9. The energy absorbing arrangement of claim 1, wherein the threshold value is between about 4,000 pound-force and about 8,500 pound-force.

10. The energy absorbing arrangement of claim 1, wherein the deformable member comprises at least one of steel, aluminum, aluminum alloy, titanium, or titanium alloy.

11. The energy absorbing arrangement of claim 1, wherein the deformable member comprises a martensitic precipitation-hardening stainless steel.

* * * * *